Aug. 6, 1935.  H. V. BARCLAY  2,010,343
FASTENER FOR FABRICS AND THE LIKE
Filed June 16, 1933
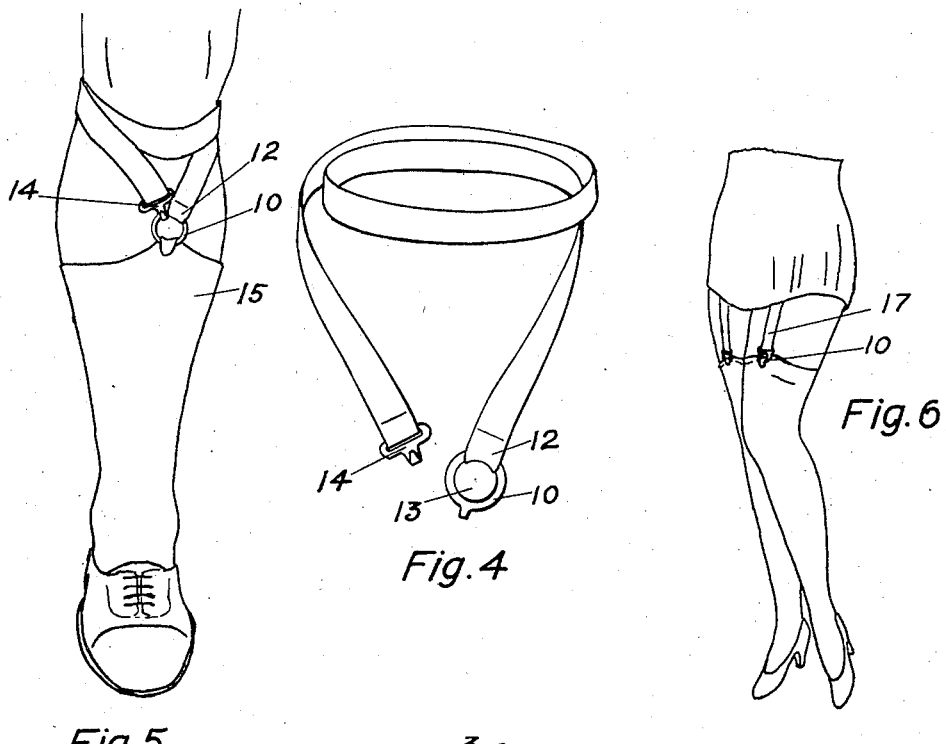
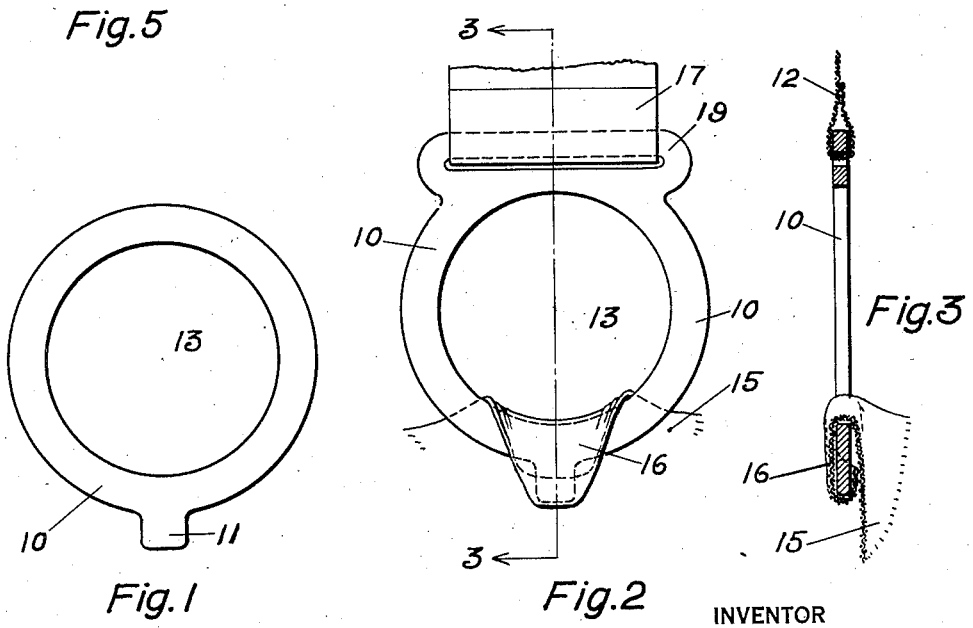
INVENTOR
Hjalmar V. Barclay
BY
H. R. Van Deventer
ATTORNEY Patented Aug. 6, 1935

2,010,343

UNITED STATES PATENT OFFICE 2,010,343

FASTENER FOR FABRICS AND THE LIKE

Hjalmar V. Barclay, Corona, N. Y.

Application June 16, 1933, Serial No. 676,043

1 Claim. (Cl. 241—6)

This invention relates to improvements in fasteners for fabrics and the like and more particularly to fasteners for garters and hose supporters.

An object of the invention is to provide a fastener that can be made in one piece and that does not require any clamping means or snap to secure it to the fabric with which it is used.

Another object is to provide a fastener that will lie flat on the leg when used on a supporter or garter.

A further object is to provide a fastener that is simple and cheap to manufacture.

Other objects will be apparent from the following specification where for the sake of illustration the fastener is shown as applied to a garter and a hose supporter although it may be used for a variety of other purposes.

In the accompanying drawing:

Figure 1 is a front view of one form of the fastener constituting this invention;

Figure 2 is a front view of a modification of the fastener of Figure 1 showing the fastener attached to a supporter or the like and engaging a stocking;

Figure 3 is a sectional view on the line 3—3 of Figure 2;

Figure 4 is a view of the fastener of Figure 1 attached to a garter;

Figure 5 shows the garter of Figure 4 in use; and

Figure 6 shows the fastener of Figure 2 in use as a hose supporter.

The fastener 10 as shown in Figure 1 may have an annular body having one or more outwardly extending lugs 11 preferably having blunt but slightly rounded ends as shown, when used with knitted fabrics such as stockings.

This fastener may be made of any suitable material such as metal, bakelite, celluloid and the like and may be cast, stamped, pressed or otherwise fabricated in any suitable manner. A desirable material is heavy sheet celluloid from which the fasteners are punched the edges being rounded slightly. Colored celluloid may be used to match the hosiery with which the fastener is employed.

The fastener 10 is secured to the garter 12 in any suitable manner such as by passing one end of the garter through the centre 13 of the fastener and sewing the end as shown in Figure 4. The garter (which with this type of fastener may be non-elastic) is then wound round the leg of the user as shown in Figure 5 and the clasp 14 hooked in place, the hook of the clasp going underneath the ring of the fastener 10 as shown in the figure.

The stocking 15 is attached to the fastener by pulling a portion of it through the fastener from the rear, pulling this downward as shown at 16 and looping it under the lug 11 all as shown in Figure 3. Knitted fabrics like socks, women's hosiery and the like are readily secured to the fastener by this simple means.

An alternate form of fastener is shown in Figure 2 in which the annular portion 10 has an upwardly extending portion indicated at 19 having a slot therein adapted to receive the supporter 17. In other respects the fastener, Figure 2, is substantially the same as that shown in Figure 1, but is particularly adapted for use with hose supporters as shown in Figure 6, the provision of the extension 19 keeping the supporter flat on the leg of the wearer when the same encounters a vertical pull and the slot preventing any wrinkling or bunching of the supporter were it secured directly to the annular portion 10 of the fastener.

What is claimed is:

A garter comprising a fastener having a substantially ring-like body portion with an integral lug extending outwardly therefrom, a garter strap adapted to be wrapped around the leg of the wearer secured around the annular portion of said body, and a clasp secured to the free end of said strap adapted to enter said ring-like body and engage the annular wall thereof at a point between that to which said strap is secured and said lug, said ring-like body being adapted to receive the fabric to be held whereby same may be hooked over the lug thereon and held thereby.

HJALMAR V. BARCLAY.